(12) United States Patent
Grand

(10) Patent No.: US 9,701,397 B2
(45) Date of Patent: Jul. 11, 2017

(54) FLIGHT CONTROL ACTUATOR DRIVE

(71) Applicant: Goodrich Actuation Systems SAS, Buc (FR)

(72) Inventor: Serge Grand, Villebon sur Yvette (FR)

(73) Assignee: GOODRICH ACTUATION SYSTEMS SAS, Buc (FR)

( * ) Notice: Subject to any disclaimer, the term of this patent is extended or adjusted under 35 U.S.C. 154(b) by 141 days.

(21) Appl. No.: 14/639,255

(22) Filed: Mar. 5, 2015

(65) Prior Publication Data
US 2015/0251748 A1 Sep. 10, 2015

(30) Foreign Application Priority Data

Mar. 5, 2014 (EP) .................................... 14305310

(51) Int. Cl.
| B64C 13/34 | (2006.01) |
|---|---|
| F16H 37/08 | (2006.01) |
| F16H 1/36 | (2006.01) |
| B64C 13/42 | (2006.01) |
| B64C 13/50 | (2006.01) |

(52) U.S. Cl.
CPC .............. *B64C 13/34* (2013.01); *B64C 13/42* (2013.01); *B64C 13/50* (2013.01); *F16H 1/36* (2013.01); *F16H 37/0826* (2013.01)

(58) Field of Classification Search
None
See application file for complete search history.

(56) References Cited

U.S. PATENT DOCUMENTS

| 3,203,275 A * | 8/1965 | Hoover ................... B64C 13/34 244/99.2 |
|---|---|---|
| 4,441,675 A | 4/1984 | Boehringer |
| 4,637,272 A | 1/1987 | Teske |
| 4,760,964 A | 8/1988 | Burandt |
| 8,888,649 B2 * | 11/2014 | Scekic ................ F16H 37/0826 475/154 |
| 2004/0214677 A1 | 10/2004 | Koenig |
| 2005/0103928 A1 * | 5/2005 | Flatt ....................... B64C 13/24 244/10 |
| 2013/0184112 A1 * | 7/2013 | Choi ..................... F16H 37/065 475/5 |

FOREIGN PATENT DOCUMENTS

DE           139541 C      12/1899

OTHER PUBLICATIONS

European Search Report for Application No. EP14305310, Mailed on Jun. 23, 2014, 5 pages.

* cited by examiner

Primary Examiner — Jacob S Scott
(74) *Attorney, Agent, or Firm* — Cantor Colburn LLP

(57) ABSTRACT

A flight control actuator drive including a first motor for providing a first rotational input, a second motor for providing a second rotational input and a speed summing device for combining the first and second rotational inputs into a rotational output for controlling an actuator. The speed summing device comprises first and second input gears to which the first and second motors are connected via first and second irreversible gears so that the first and second input gears can each transmit power in one direction only. The speed summing device may be a planetary gear assembly.

16 Claims, 3 Drawing Sheets

FLIGHT CONTROL ACTUATOR DRIVE

FOREIGN PRIORITY

This application claims priority to European Patent Application No. 14305310 filed Mar. 5, 2014, the entire contents of which is incorporated herein by reference.

TECHNICAL FIELD

The present disclosure relates to a flight control actuator drive, and in particular a redundant flight control actuator drive and a speed summing device for use in a flight control system.

BACKGROUND

A flight control actuator is used on an aircraft to modify one or more flight parameters by driving a flight control surface.

Traditionally, the flight control system sends a command to an electric motor drive which, in turn, powers an electric motor which provides a rotational output that is used to operate the actuator. The part of this system that is most prone to failure is the electronics that powers the motor, due to the high temperatures cycling experienced. As such, it is known to use two separate motors and motor drives to power the actuator to provide redundancy in case one motor drive fails or one motor jams.

A speed summing device can be used to combine the rotations of the two motors to give an output for operating the actuators. However, if one of the motor drives fails, this can cause the whole device to become non-operational as the rotational input of the operational motor can cause the failed motor to be driven backwards, instead of this rotation being transmitted to the output shaft of the speed summing device.

Various electromechanic braking arrangements have been proposed to prevent the failed motor being back-driven but these brakes can add excess weight and complexity to the system.

The present disclosure seeks to address at least some of these issues.

SUMMARY

There is disclosed herein a speed summing device for driving an actuator linked to an aerodynamic surface, the speed summing device comprising a first ring gear arranged to rotate about a central axis, a second ring gear arranged to rotate about the central axis, a plurality of pairs of planet gears, each pair comprising a first planet gear driveably connected to the first ring gear and a second planet gear driveably connected to the second ring gear, wherein the first and second planet gears of each pair are driveably connected to each other and a planet carrier providing a rotary output for controlling an actuator, the planet carrier being driveably connected to the planet gears such that movement of the planet gears around the central axis causes the planet carrier to rotate but rotation of the planet gears about their own axes does not cause the planet carrier to rotate.

The term "driveably connected" should be understood to mean that the two parts in question are connected together such that one can drive the other, and/or vice versa, but not necessarily that the parts are directly engaged. For example, the two parts could be connected via an intermediate member that passes motion and forces between the two parts.

The speed summing device may be a flat type, i.e. it does not use conical or bevel gears.

The speed summing device may drive a mechanical actuator that may, for example, be linked to an aerodynamic/flight control surface.

The speed summing device may therefore comprise a planetary gear assembly formed of the two ring gears, the pairs of planet gears and the planet carrier. The ring gears are located radially outward of the planet gears so that the planet gears can move within the ring gears. Put another way, the ring gears encircle the planet gears. The planet carrier may also be known as a planet cage or a planet pinion carrier in the art. The planet gears may also be known as satellite gears in the art.

The planet gears may be free to rotate about their own axes relative to the planet carrier (ignoring any frictional losses etc.). In other words, such rotational motion of the planet gears is not imparted to the planet carrier. Bearings may be provided between the planet gears and the planet carrier to achieve this freedom of motion.

Rotating the first ring gear about the central axis may cause the first planet gear to move together with the first ring gear around the central axis. In this movement alone, the first planet gear is rotating about the central axis, but not about its own axis as the first planet gear does not rotate relative to the first ring gear, to which it is connected. The same applies for the second ring gear and the second planet gear.

If the first ring gear and the second ring gear are both rotating, in the same direction at the same speed, the pairs of planet gears move together with the first and second ring gears about the central axis without the planet gears rotating about their axes. In this situation, all the rotation of the planet gears is supplied to the planet carrier (barring any efficiency losses due to friction etc.).

However, if the first and second ring gears are rotated at different speeds, or one is held stationary, then the planet gears in each pair will rotate relative to each other about their own axes. The rotation of the planet gears about their own axes is not passed to the planet carrier. As such, the slower moving (or stationary) ring gear reduces the amount of rotation passed to the planet carrier, compared to the situation where that ring gear was rotating at the same speed as the other.

The planet carrier may comprise a rotary output shaft for connection to an actuator.

The planet carrier may comprise first and second plates. The planet gears may be driveably connected to the first and second plates. In particular, the planet gears may be connected to the first and second plates such that rotation of the planet gears about the central axis causes the plates to rotate, but rotation of the planet gears about their own axes does not cause the plates to rotate. For example, first and second end portions of the planet gears may pass into or through the first and second plates but may be free to rotate relative to the end plates. The first and second plates may be connected to each other, so that they rotate together.

The rotary output shaft, if present, may extend from one of the first or second plates.

The first and second plates may be spaced apart along the axial direction, with the first and second ring gears being positioned at (different) axial positions between the first and second end plates. The axial direction of the speed summing device is that direction that is parallel to the central axis.

The planet gears may extend between the first and second plates and engage the respective ring gears at axial locations between the plates.

The first and second ring gears may each comprise a row of internal teeth on their inner circumferential surfaces and a row of external teeth on their outer circumferential surfaces. The first and second planet gears may engage the internal teeth of the first and second ring gears respectively.

The first and second planet gears of each pair may be directly engaged with each other. For example, the planet gears may each comprise teeth on their outer circumferential surface, with the teeth of the first planet gear engaging the teeth of the second planet gear of the same pair.

The first planet gears may not directly engage the second ring gear and the second ring gears may not directly engage the first ring gear.

The first and second planet gears may each have an enlarged cross-section portion for engaging the internal teeth of the first and second ring gears respectively and a reduced cross-section portion. The cross-section is taken in the radial direction of the planet gears, i.e. at a right angle to the axes of these gears. The reduced cross-section portions of the first and second planet gears may be aligned axially with the second and first ring gears respectively, so that the first planet gear does not engage (or interfere) with the second ring gear and the second planet gear does not engage with the first ring gear. The planet gears may have two reduced cross-section portions that extend into the first and second plates of the planet carrier.

The enlarged cross-section portions of each first planet gear may directly engage the enlarged cross-section portion of the second planet gear of the same pair.

The speed summing device may comprise two or more pairs of planet gears. For example, the speed summing device may have exactly two, three or four pairs.

The present disclosure extends to a flight control actuator drive comprising the speed summing device described above, a first motor driveably connected to the first ring gear via a first irreversible gear so that the first ring gear can transmit power in one direction only and a second motor driveably connected to the second ring gear via a second irreversible gear so that the second ring gear can transmit mechanical power in one direction only, namely from the motors to the speed summing device.

The irreversible gears prevent the first and second ring gears from being rotated by the planet gears and from transmitting power from the planet gears to the motors.

The present disclosure also extends to a flight control actuator drive comprising a first motor for providing a first rotational input, a second motor for providing a second rotational input and a speed summing device for combining the first and second motor rotational inputs into a rotational output for controlling an actuator, wherein the speed summing device comprises first and second input gears and the first and second motors are connected to the first and second input gears via the first and second irreversible gears so that the first and second input gears can each transmit the mechanical rotation power in one direction only, namely from the motors to the speed summing device.

The speed summing device may be as described above, for example the first and second input gears may be the first and second ring gears.

The motors may be electric motors or any available rotating power supply.

The irreversible gears prevent the ring gears or input gears from being rotated by the power coming back from the speed summing device and thus prevent the motor being back-driven.

The first and second irreversible gears may each comprise a worm gear. As will be understood by the skilled person, worm gears can only be driven from one side.

The present disclosure also extends to a method of controlling an actuator comprising using the speed summing device or the flight control actuator drives discussed above.

Any of the above mentioned flight control actuator drives may further comprise an actuator. The actuator may be arranged to control one or more flight control surfaces.

BRIEF DESCRIPTION OF THE DRAWINGS

Some exemplary embodiments of the present disclosure will now be described by way of example only and with reference to FIGS. 1 to 4, of which:

FIGS. 1 to 4 show a flight control actuator drive 100 comprising a first electric motor 10, a second electric motor 12 and a speed summing device 20. The speed summing device 20 comprises a first ring gear 22, a second ring gear 24, a plurality of planet gears 30, 32 and a planet carrier having first and second plates 25, 28. Connected to the first plate 25 is a rotary output shaft 26 for driving an actuator (now shown). Rotation of the first plate 25 causes the shaft 26 to rotate concurrently. The actuator may control the position of a flight control surface (i.e. an aerodynamic surface), such as a yaw rudder or an aileron.

Figure 1:
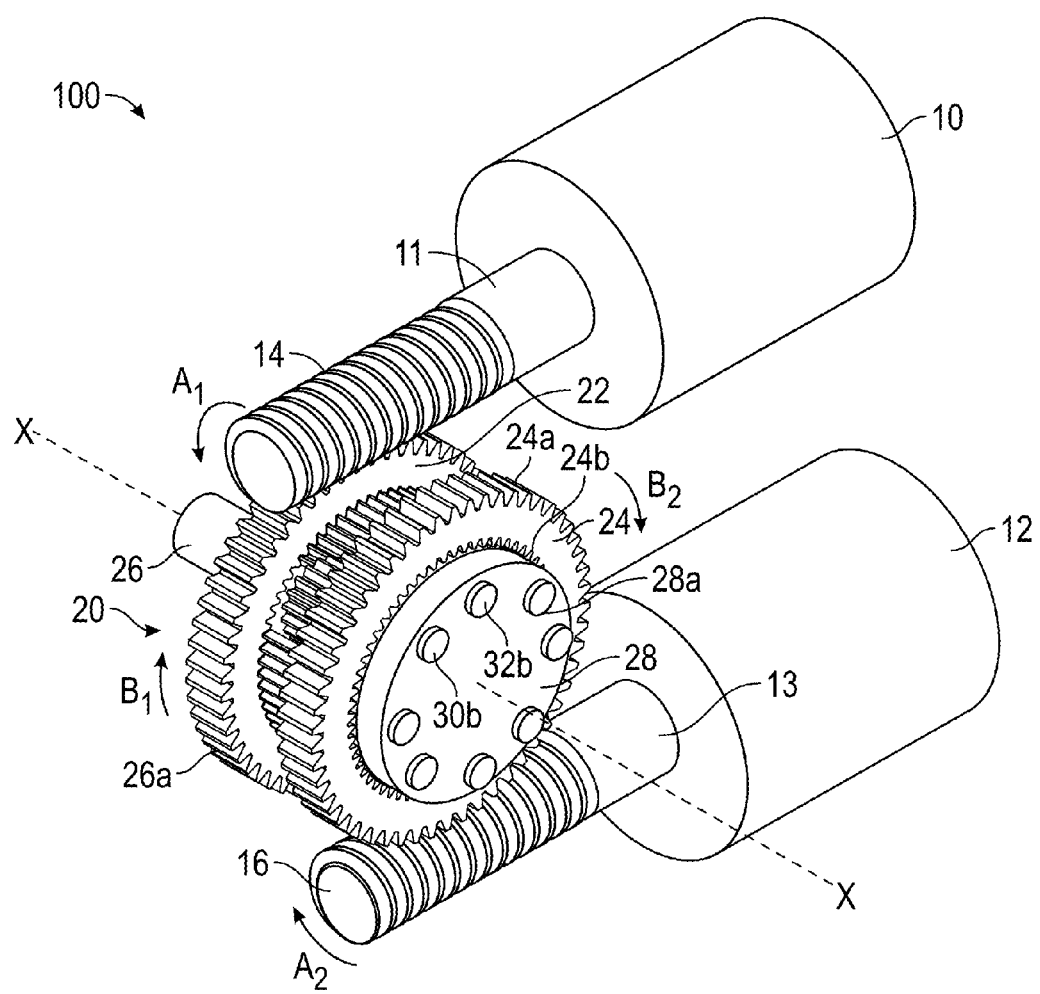
FIG. 1 shows a three-dimensional view of a flight control actuator drive according to one embodiment of the present disclosure.

The first and second ring gears 22, 24 each have a row of external teeth 22a, 24a on their outer circumference and a row of internal teeth 22b, 24b on their inner circumference.

The first and second electric motors 10, 12 each have a rotary output shaft 11, 13 comprising a worm gear 14, 16. The worm gears 14, 16 engage the external teeth 22a, 24a of the two ring gears 22, 24. Due to the angle of the teeth of the worm gears 14, 16 and the external teeth 22a, 24a of the ring gears 22, 24 the worm gears 14, 16 can drive the ring gears 22, 24 in a first rotational direction, but the ring gears 22, 24 cannot drive the worm gears 14, 16 in the opposite direction. As such, the worm gears 14, 16 act as irreversible or one-way gears.

In this arrangement, there are eight planet gears 30, 32. The planet gears 30, 32 are arranged in four pairs. Each pair comprises a first planet gear 30 and a second planet gear 32.

The first planet gears 30 have external teeth 30c that engage the internal teeth 22b of the first ring gear 22. The first planet gears 30 have first and second ends 30a, 30b of a reduced cross-section (compared to the portion of the planet gear 30 having teeth 30c). The first and second ends 30a, 30b extend through apertures 25a, 28a in the first and second plates 25, 28 of the planet carrier. The first planet gears 30, are free to rotate, about their own axes, within the apertures 25a, 28a, relative to the first and second plates 25, 28.

The second planet gears 32 have external teeth 32c that engage the internal teeth 24b of the second ring gear 24. The second planet gears 32 have first and second ends 32a, 32b of a reduced cross-section (compared to the portion of the planet gear 32 having teeth 32c). The first and second ends 32a, 32b extend through the apertures 25a, 28a in the first and second plates 25, 28 of the planet carrier. The second planet gears 32 are free to rotate, about their own axes, within the apertures 25c, 28c, relative to the first and second plates 25, 28.

Figure 3:
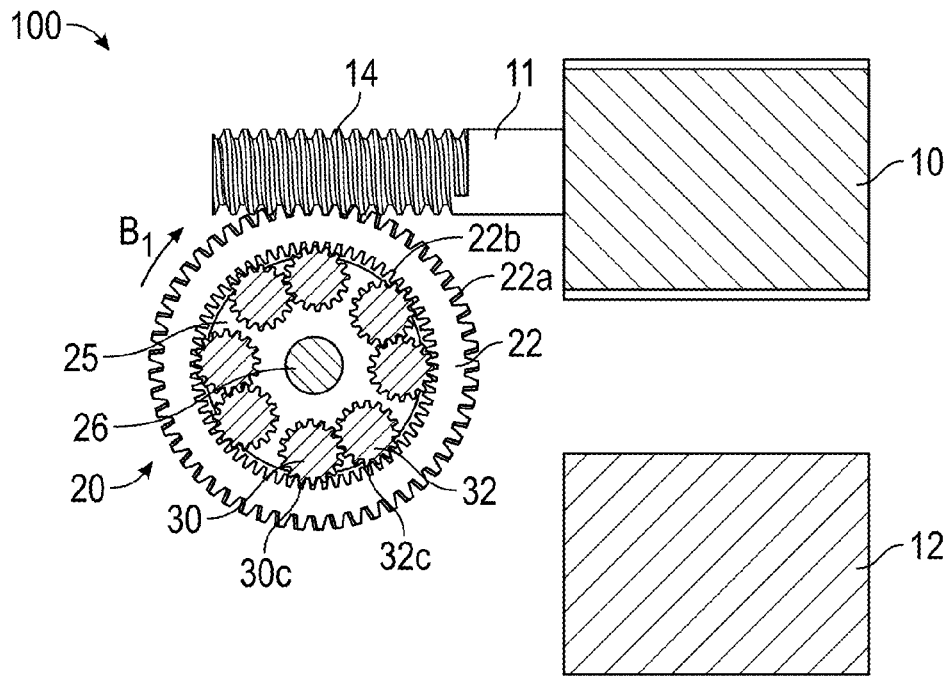
FIG. 3 shows a cross-sectional view through section A-A in FIG. 2.
Figure 4:
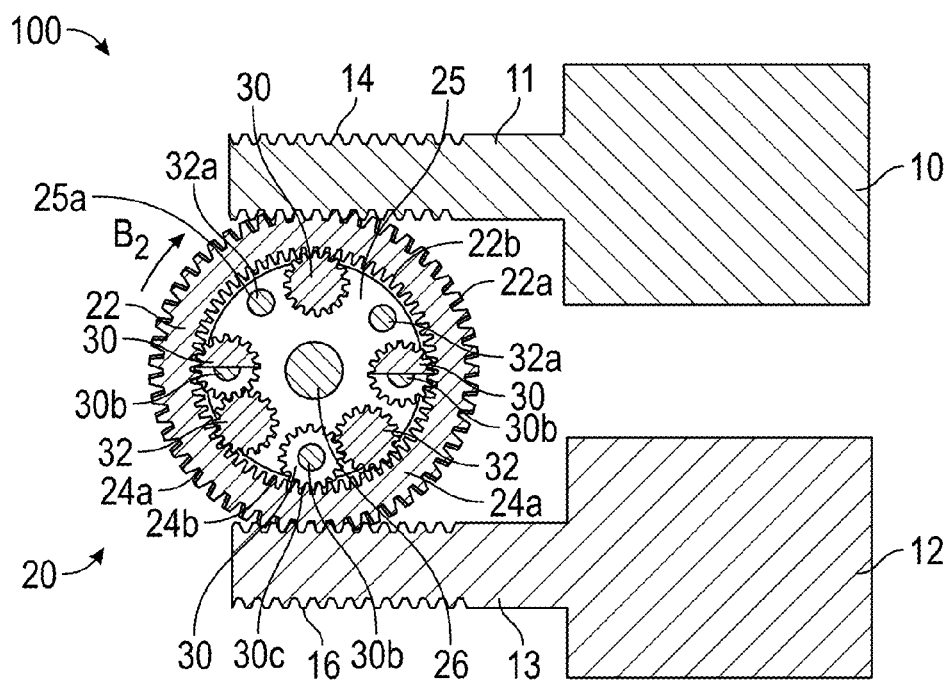
FIG. 4 shows a cross-sectional view through section B-B in FIG. 2.

The first and second planet gears 30, 32 of each pair are engaged with each other, via their external teeth 30c, 32c, as shown in FIGS. 3 and 4. In order to do this, the enlarged cross-section portions of the first and second planet gears 30, 32, having external teeth 30c, 32, overlap with each other in the axial gap between the first and second plates 25, 28.

The reduced cross-section portion of the second end 30b of the first planet gear 30 extends along the first planet gear 30 to a position between the first and second ring gears 22, 24 so that the teeth 30c (on the enlarged portion) do not engage the second ring gear 24. In the same way, the reduced cross-sectional portion at the first end 32a of the second planet gear 32 extends along the second planet gears 32 to a position between the first and second ring gears 22, 24 so that the teeth 32c (on the enlarged portion) do not engage the first ring gear 22.

Figure 2:
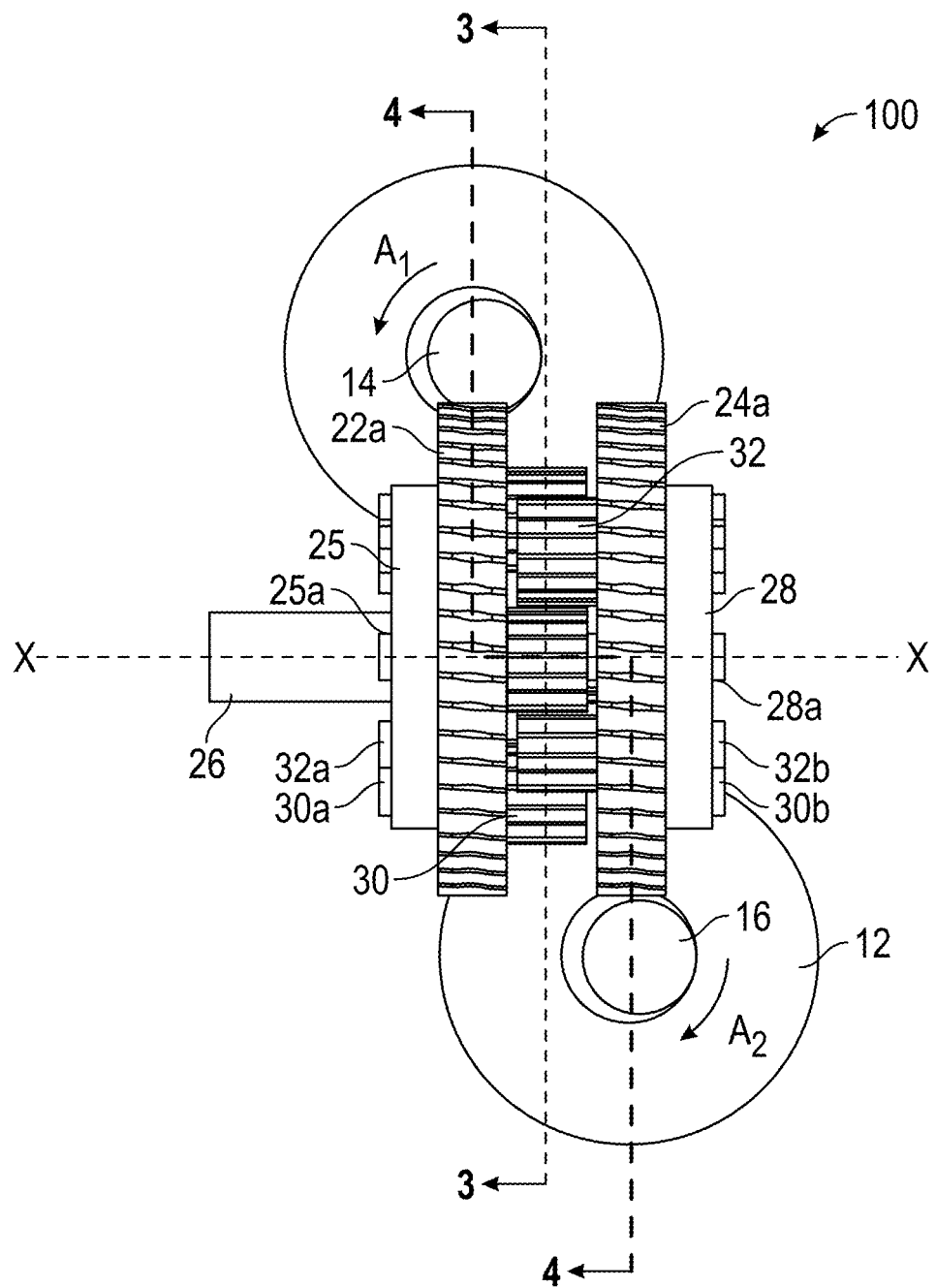
FIG. 2 shows a side view of the flight control actuator drive of FIG. 1.

FIG. 3 shows a cross-sectional view of the first control actuator drive 100 through line A-A in FIG. 2. The line A-A passes through the gap between the two ring gears 22, 24 and shows the four engaged pairs of first and second planet gears 30, 32.

FIG. 4 shows a cross-sectional view of the flight control actuator drive 100 through line B-B in FIG. 2. The line B-B passes through the top half of first ring gear 22, along the central axis X of the speed summing device 20 and through the lower half of the second ring gear 24. The line B-B thus passes through two different vertical planes.

FIG. 4 shows the first planet gears 30 engaged with the teeth 22b of the first ring gear 22 (upper half of figure) and the second planet gears 32 engaged with the teeth 24b of the second ring gear 24 (lower half of figure). The engagement of the first and second planet gears 30, 32, within each pair, can again be seen. In the lower half of the figure, the reduced cross-section portion 30b and the enlarged cross-section portion (having teeth 30c) of the first planet gear 30 can be seen. In the upper half of the figure, the reduced cross-section portions 32a of the second planet gears 32 can be seen. The reduced cross-section portions 30b, 32a are not engaged with the ring gears 30, 32.

In normal operation, in order to rotate shaft 26 (and operate the actuator), both motors 10, 12 are activated. The rotation of motor shafts 11, 13 and the worm gears 14, 16 causes the ring gears 22, 24 to rotate. In particular, rotating worm gear 14 in direction A1 (FIG. 1) (anti-clockwise when viewed from the end of the worm gear 14) causes the first ring gear 22 to rotate in direction B1, and rotating worm gear 13 in direction A2 (clockwise from the end of the worm gear 13) causes the second ring gear 24 to rotate in direction B2. Directions B1 and B2 are the same.

Rotating first ring gear 22 in direction B1 causes first planet gears 30 to move around the central axis X of the speed summing device 20 with the first ring gear 22. In this movement, the particular teeth 30c of the first planet gear 30 that are engaged with the inner teeth 22b of the first ring gear remain engaged with each other. In other words, there is no movement of the first planet gears 30 along the teeth 22b of the first ring gear 22. The only rotation of the first ring gears 30, around their own axes, is that caused by the rotation around the central axis, i.e. each first planet gear 30 moves through 360° during one rotation of the first ring gear 22.

The same can be said for the second ring gears 32, which are engaged with the inner teeth of the second ring gear 24 and move around the central axis X with the second ring gear as it is rotated.

As the first and second planet gears 30, 32 of each pair are engaged with each other, they will move around their respective ring gears 22, 24 together. If both ring gears 22, 24 are rotating at the same speed (in the same direction due to the worm gears), then each pair of planet gears 30, 32 will move around the central axis X without rotating about their own axes relative to each other, i.e. the particular teeth 30c, 32c of the ring gears 30, 32 remain engaged through the rotation around the central axis X. The movement of the planet gears 30, 32 around the central axis X causes the planet carrier, i.e. plates 25 and 28, to rotate about the central axis X. This causes rotary output shaft 26 to rotate.

If one of the ring gears 22, 24 is rotating at a different speed to the other, this causes the first and second planet gears 30, 32 to rotate about their own axes relative to each other.

For example, if the first ring gear 22 is not rotating at all, possibly due to a motor 10 or motor drive failure, and the second ring gear 24 is rotating normally, then the first planet gears 30 will be pushed around the inner circumference of the first ring gear 22 by the second planet gears 32, with which they are engaged. As the first ring gear 22 is not rotating, the first planet gears 30 need to rotate about their own axes in order to travel around the central axis X. In other words, the first planet gears 30 roll along the inner teeth 22b of the first ring gear 22.

As the first planet gears 30 rotate about their own axes, so will the second planet gears 32, with which they are engaged. So, as well as moving around the central axis X, both the first and second planet gears 30, 32 will be rotating about their own axes. The rotation about the axes of the planet gears 30, 32 is not transmitted to the planet carrier plates 25, 28 as the first and second ends 30a, 30b, 32a, 32b of the planet gears 30, 32 are free to rotate in the apertures 25a and 28a of the plates 25, 28. As such, not all of the motion of the second ring gear 24 is transmitted to the rotary output shaft 26 when the first ring gear 22 is stationary. If the first motor 10 should fail, the second electric motor 12 would therefore need to be commanded to rotate the shaft 13 at a higher speed in order to provide the same rotation to output shaft 26 (in order to operate the actuator).

The same applies should the first motor 10 be operational but the second motor 12 fail.

It can be seen therefore that the present disclosure provides a flight control actuator drive 100 that can operate using one or two motors. The failure of one motor does not cause the drive to stop working. Redundancy is therefore provided. The foregoing description is only exemplary of the principles of the invention. Many modifications and variations are possible in light of the above teachings. It is, therefore, to be understood that within the scope of the appended claims, the invention may be practiced otherwise than using the example embodiments which have been specifically described. For that reason the following claims should be studied to determine the true scope and content of this invention.

The invention claimed is:

1. A speed summing device for driving an actuator, the speed summing device comprising:
   a first ring gear arranged to rotate about a central axis (X);
   a second ring gear arranged to rotate about the central axis (X);

a plurality of pairs of planet gears, each pair comprising a first planet gear driveably connected to the first ring gear and a second planet gear driveably connected to the second ring gear, wherein the first and second planet gears of each pair are driveably connected to each other; and a planet carrier providing a rotary output for controlling an actuator, the planet carrier being driveably connected to the planet gears such that movement of the planet gears around the central axis (X) causes the planet carrier to rotate but rotation of the planet gears about their own axes does not cause the planet carrier to rotate.

2. The speed summing device of claim 1, wherein the planet carrier comprises a rotary output shaft for connection to an actuator.

3. The speed summing device of claim 1, wherein the planet carrier comprises first and second plates and each of the planet gears is driveably connected to the first and second plates.

4. The speed summing device of claim 3, wherein the first and second plates are spaced apart along the axial direction, with the first and second ring gears being positioned at axial positions between the first and second plates.

5. The speed summing device of claim 1, wherein the first and second ring gears each comprise a row of internal teeth on their inner circumferential surfaces and a row of external teeth on their outer circumferential surfaces and the first and second planet gears engage the internal teeth of the first and second ring gears respectively.

6. The speed summing device of claim 1, wherein the first and second planet gears of each pair are directly engaged with each other.

7. The speed summing device of claim 1, wherein the first planet gears do not directly engage the second ring gear and the second ring gears do not directly engage the first ring gear.

8. The speed summing device of claim 7, wherein the first and second planet gears each have an enlarged cross-section portion for engaging the internal teeth of the first and second ring gears respectively and a reduced cross-section portion, wherein the reduced cross-section portions of the first and second planet gears are aligned in the radial direction, relative to the central axis, with the second and first ring gears respectively.

9. The speed summing device of claim 8, wherein the enlarged cross-section portions of each first planet gear engages directly with the enlarged cross-section portion of the second planet gear of the same pair.

10. The speed summing device of claim 1, comprising two or more pairs of planet gears.

11. A flight control actuator drive comprising:
the speed summing device of claim 1;
a first motor driveably connected to the first ring gear via a first irreversible gear so that the first ring gear can transmit power in one direction only; and
a second motor driveably connected to the second ring gear via a second irreversible gear so that the second ring gear can transmit power in one direction only.

12. The flight control device actuator drive of claim 11, wherein the first and second irreversible gears each comprise a worm gear.

13. A flight control actuator drive comprising:
a first motor for providing a first rotational input;
a second motor for providing a second rotational input; and
a speed summing device for combining the first and second rotational inputs into a rotational output for controlling an actuator, wherein the speed summing device comprises first and second input gears and the first and second motors are connected to the first and second input gears via first and second irreversible gears so that the first and second input gears can each transmit power in one direction only.

14. The flight control actuator drive of claim 13, wherein the speed summing device comprises:
a first ring gear arranged to rotate about a central axis (X);
a second ring gear arranged to rotate about the central axis (X);
a plurality of pairs of planet gears, each pair comprising a first planet gear driveably connected to the first ring gear and a second planet gear driveably connected to the second ring gear, wherein the first and second planet gears of each pair are driveably connected to each other; and
a planet carrier providing a rotary output for controlling an actuator, the planet carrier being driveably connected to the planet gears such that movement of the planet gears around the central axis (X) causes the planet carrier to rotate but rotation of the planet gears about their own axes does not cause the planet carrier to rotate.

15. The flight control device actuator drive of claim 13, wherein the first and second irreversible gears each comprise a worm gear.

16. The flight control device actuator drive of claim 14, wherein the first and second irreversible gears each comprise a worm gear.

* * * * *